United States Patent

[11] 3,594,495

[72] Inventor Donald S. Bond
Princeton, N.J.

[21] Appl. No. 701,642
[22] Filed Jan. 30, 1968
[45] Patented July 20, 1971
[73] Assignee RCA Corporation

[54] RADIO FACSIMILE POSTAL SYSTEM
4 Claims, 3 Drawing Figs.

[52] U.S. Cl. .......... 178/5, 178/5.1, 178/6, 178/DIG. 13, 325/55, 325/64
[51] Int. Cl. .......... H04n 7/16
[50] Field of Search .......... 178/5, 5.1, 6, 6 PD, 6 TM, 61 NO; 325/55, 64

[56] References Cited

UNITED STATES PATENTS

| | | | |
|---|---|---|---|
| 2,740,106 | 3/1956 | Phelps | 325/55 |
| 3,314,051 | 4/1967 | Willcox | 325/55 |
| 2,401,405 | 6/1946 | Bedford | 178/5.1 |
| 2,619,530 | 11/1952 | Roschke | 178/5.1 |

OTHER REFERENCES

"Electronic Speed Mail," Gilmore, POPULAR ELECTRONICS, April 1961 pg. 41—45

"Extra-Terrestrial Relays," Clarke, WIRELESS WORLD, Oct. 1945 pp. 305—308

"Central Dipoles Aid Telesetups," RADIO AND TELEVISION RETAILING, Mar. 1948 pp. 80—81

*Primary Examiner*—Robert L. Griffin
*Assistant Examiner*—Joseph A. Orsino, Jr.
*Attorney*—Eugene M. Whitacre

ABSTRACT: A radio facsimile postal system including means for transmitting image signals representative of a written message to be communicated together with code signals uniquely identifying the addressee, and means for receiving the transmitted image and code signals and for reproducing the message from the image signals upon a radio facsimile recorder conditioned to respond only to the code signals identifying the assigned addressee.

INVENTOR
DONALD S. BOND
BY
Charles Brodsky
ATTORNEY

INVENTOR
DONALD S. BOND

BY

Charles Brodsky
ATTORNEY

RADIO FACSIMILE POSTAL SYSTEM

This invention relates to radio facsimile transmission systems and, more particularly, to a radio facsimile postal system providing high-speed mail service with complete privacy.

As will become clear hereinafter, such a postal system includes a "radio mailbox" in which a deposited letter to be sent is electronically scanned and converted into corresponding image signals. Coaxial lines, radio relay links, or the like, are also included, to transmit these image signals to a central, or "electronic,"post office, where a predetermined electrical code is added, indicative of the name and address of the one person for whom the letter is destined. The composite message, i.e., image and code signals together, are then directed by way of an included transmitter and either microwave relay network or satellite in synchronous equatorial orbit, for example, to that geographical area in which "delivery" is to be made. A radio facsimile recorder located at the situs of the addressee is further included and conditioned to respond only to message signals having that identifying code, to provide a permanent copy of the transmitted letter.

It will be readily apparent that a postal system of this type can greatly simplify the delivery of mail, especially on a cross-country and transoceanic basis. Not only will such a system significantly reduce the time between sending and receipt of mail, but the tremendous rail, plane and ship tonnages involved in such delivery will also be greatly cut. By further providing for the return of the deposited letter to the sender immediately after it has been converted into a video message, complete privacy is assured because no one other than the sender and the addressee will have access to the letter.

The novel features which are considered to be characteristic of this invention are set forth with particularity in the appended claims. The invention itself, however, both as to its organization and method of operation as well as objects and advantages thereof, will best be understood from the following description when read in connection with the accompanying drawings in which:

Figure 1:
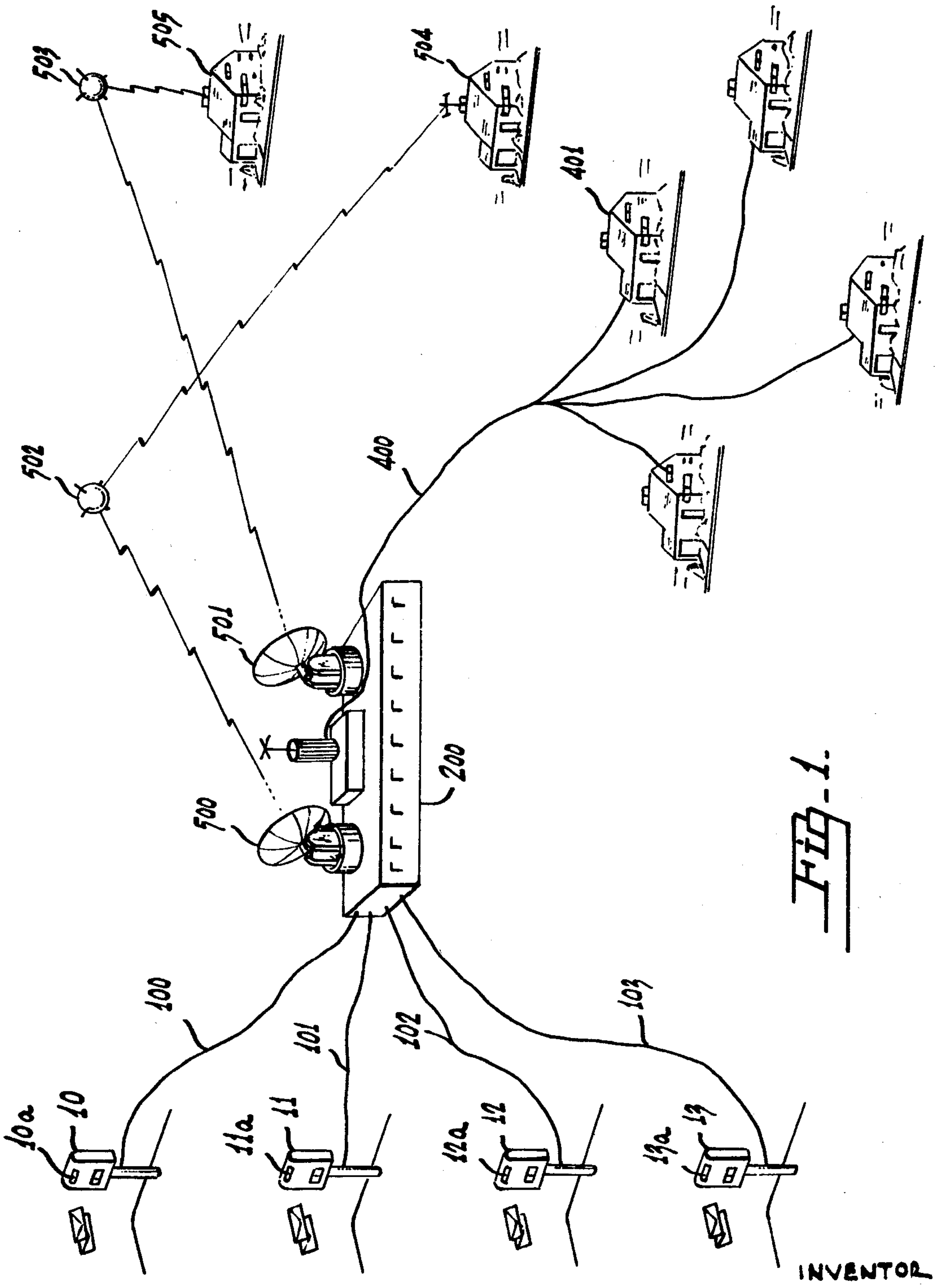
FIG. 1 is a pictorial diagram showing one embodiment of a radio facsimile postal system constructed according to the present invention.

Referring now to FIG. 1, the radio facsimile postal system pictorially shown includes a plurality of electronic scanner units or radio mailboxes 10, 11, 12, 13, etc., each of which is coupled by means of a coaxial line, radio relay link, or the like, 100, 101, 102, 103, etc. to a central, or electronic, post office 200. One of these post offices may be so located as to serve the entire population of a small town, while many may be employed in serving the needs of a large city. The individual scanner units 10, 11, 12, 13, etc. may be located in public places, in office buildings, in multiple-dwelling units, or, in general, in any place where people congregate.

A person wishing to send a letter or other type of written communication prepares the letter in the usual fashion, but adds the name and address of the desired recipient at the heading of the first sheet. Depending upon the number of sheets to be transmitted, he then affixes the proper postage or, alternatively, attaches a credit card to, or inserts a credit card with, the letter being sent. The first sheet of the letter, with postage or credit card attached or added, is then deposited by the sender in the scanner slot (10*a*, 11*a*, 12*a*, 13*a*, etc.) of the one of the radio mailboxes 10, 11, 12, 13, etc., serving his particular area, for example.

The central post office 200, typically includes a first plurality of units to store the message informations received prior to their being transmitted in an orderly fashion, a data processing unit including central address and coding memory files for supplying destination codes to be transmitted along with the individual messages, a second plurality of units to combine the codes with the messages and to concentrate the resulting composite messages for later, successive communications, and one or more transmitter units to transmit the written messages to the desired addresses.

When the information storage unit in the central post office 200 which serves the sender's radio mailbox 10, 11, 12 or 13, etc., is ready and comes on the line, a signal is sent from the post office (in much the same way as with a telephone dial tone) directing an electronic scanner included in the selected mailbox to verify the postage (and, if of correct amount, to cancel the attached stamps) or to record the credit card data (such as name, address and identification number). The scanner is also conditioned to scan the letter and to convert the written heading address and message into video or image representative signals. If the letter to be communicated consists of more than one sheet, the sender feeds the remaining sheets into the scanner slot 10*a*, 11*a*, 12*a*, or 13*a*, etc., in a sequential manner for successive conversion to image signals.

The image representative signals so developed are carried along the connecting coaxial line, radio relay link, or the like 100, 101, 102, 103, etc., to the central office 200. The signals are there recorded in the information storage unit associated with the electronic scanner unit in use, on magnetic tape for example, while a "privacy code" is supplied by the data-processing memory file indicative of the name and address of the one person for whom the letter is destined. Because this code is uniquely associated with only one individual, the addressee, and because this code is securely maintained in the central office, assurance against unauthorized eavesdropping or interception of the transmission is afforded.

As was previously mentioned, the central post office also includes a plurality of units serving to combine individual messages and codes and to concentrate the resulting composite messages for later, successive communications. Such units function to store in numerical sequence the individual messages serially recorded on each of the plurality of included information units prior to a single communication by one of the microwave transmitter units in the central post office. More particularly, each concentrator unit incorporated in the post office effectively adds the image-representative signals and identifying code signals associated with the letter a sender wishes to transmit to the corresponding image and code signals associated with the letter previously deposited in the same radio mailbox, for example.

The concentrator units, in addition, serve to route all messages intended for a particular geographical location to the one of the transmitter units in the central post office serving that area. The routing may be such that all messages for that location which are stored in a first information unit are coupled to the particular transmitter, then the messages for that location which are stored in a second such unit are coupled to that transmitter, then the messages from a third unit, etc.

A number of different arrangements can exist for the transmission of these composite messages to the desired addressee. Where the addressee resides in the same general locality as does the sender, the concentrator unit can route the message to a community antenna television (CATV) coaxial network 400 serving that area and to which the addressee 401 is connected. (In this respect, it will be understood that such a network may comprise a system of coaxial cable circuits for carrying the desired information to a plurality of receiving units.) Alternatively, it can route the message to a television broadcast transmitter (operating at a 2500 MHz. frequency, for example) for transmission to a television receiver modified somewhat (as will be described hereinafter) so as to provide a hard copy record of the communication. Where the transmission is intended to be over greater distances, the concentrator unit at the electronic post office can direct the message into a microwave relay or coaxial network, either of fixed or switchable routing, in much the same way as with network television transmissions. The code signals identifying the addressee can in this last arrangement, provide an indication as to where in this network, the message is to be dropped off—in other words, at an intermediate location in a larger network system. In a fourth arrangement, applicable to cross-country and transoceanic transmissions, the concentrator can route the facsimile messages to microwave transmitters 500, 501 operating in conjunction with satellites 502, 503 in synchronous equatorial orbit. Transmissions from New York to an addressee location 504 in the midwestern part of the United States, for example, can be accomplished by directing the transmitter 500 at the satellite 502 located on the 90° west meridian, while similar transmission to an addressee location 505 on the west coast of the United States can be accomplished by transmitting from the transmitter 501 towards the satellite 503 situated on the 120° west meridian. Mail "deliveries" for specific localities served by these satellite can be had by radiating from the satellite from several transmitters included thereon, operating on a different frequency for each location and beamed into the same general geographical area, or on the same frequency for all locations but beamed into different geographical areas. Alternatively, transmission to the satellite at different frequencies for the different localities intended, and directive radiation of those frequency transmissions from the satellite to those regions can also be employed to provide the delivery.

The receiving unit of the electronic postal system includes a radio facsimile recorder and for all but the first transmitting arrangement described above, an antenna for receiving the message transmissions. In that first arrangement, a simple connection from the recorder to the CATV coaxial system is all that is required. In practice, almost every home and office might be equipped with one of these units—each, however, being preset with its own unique code corresponding to that interposed with the image-representative signals at the central post office location. Although all such units are capable of receiving the transmitted image and code signals, only that one recorder at the location of the assigned addressee having a corresponding identifying code will be activated to reproduce the transmitted message from the image signals. Since the message can not be recorded on any other receiving unit, they each being associated with different identifying codes, privacy will be maintained at the "receiving end" of the postal system, and complete privacy from the sender to the recipient will be assured.

Figure 2:
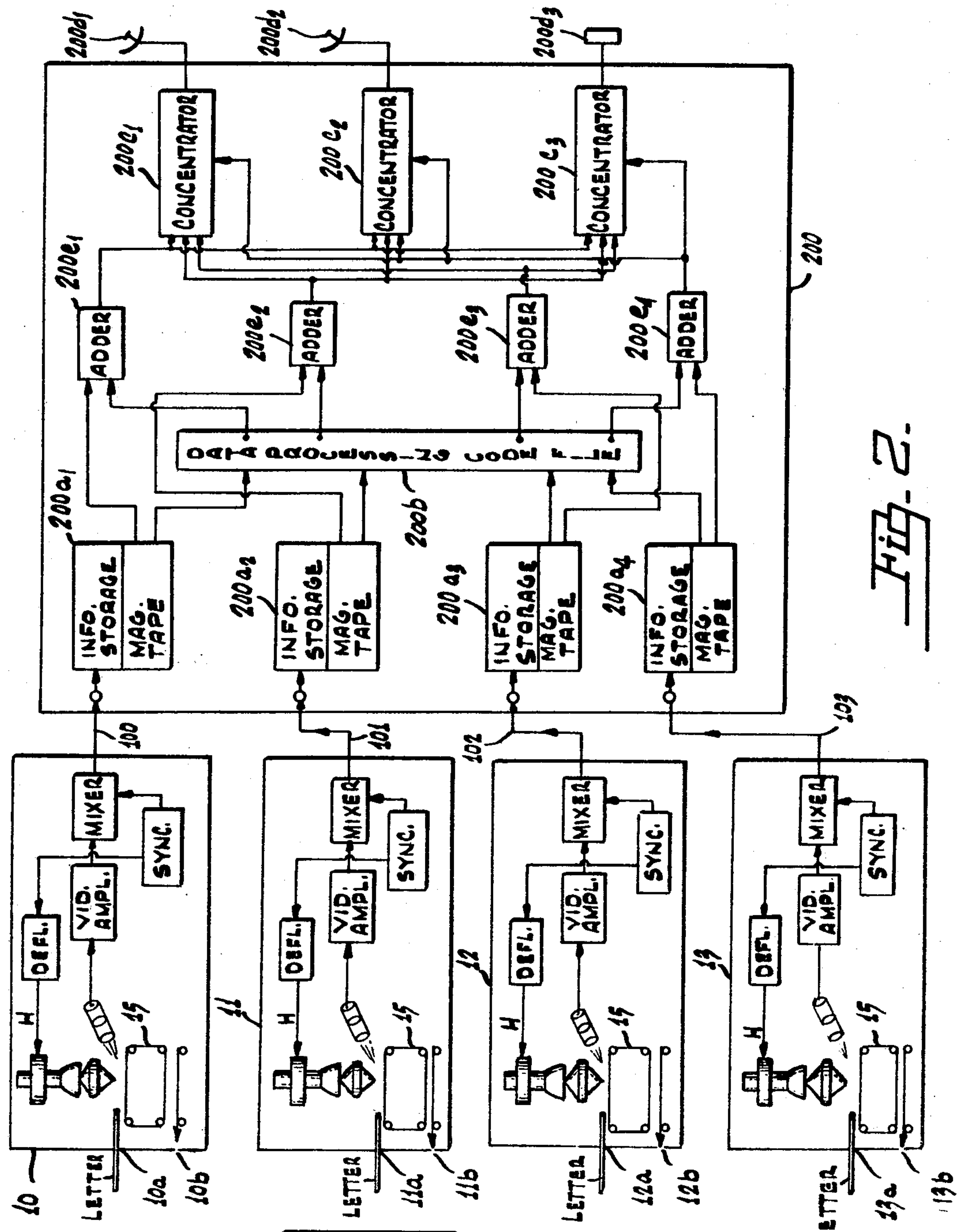
FIG. 2 is a block diagram showing one arrangement for the transmitting portion of the postal system of FIG. 1.

Referring now to FIG. 2, the block diagram of the transmitting portion of the electronic postal system there shown includes means providing a written message for transmission to a preassigned destination. Such means, shown by one of the insertion slots 10*a*, 11*a*, 12*a*, 13*a*, etc., is an integral portion of the radio mailbox or electronic scanner units 10, 11, 12, 13, etc., and cooperates therewith to generate image signals representative of the written message, including its assigned destination. The scanner units 10, 11, 12, 13, etc., may each be of the well-known flying spot type, as shown, with the belt system 15 of each serving to return the written message to the sender via the slot 10*b*, 11*b*, 12*b*, 13*b*, etc., after the conversion of the message to corresponding image signals. The coaxial lines 100, 101, 102, 103, etc., carry these signals to the central or electronic post office 200 servicing, for example, all the scanner units employed in the sender's city.

The central post office of the system includes a plurality of information storage units 200*a*$_1$, 200*a*$_2$, 200*a*$_3$, 200*a*$_4$, the precise number being determined by the number of radio mailbox scanners linked to the post office 200, by the delay in establishing the operability of the information storage units, and by the capacity of each storage unit. Indicated as including magnetic tape recorders in FIG. 2, these information storage units each record the image signals, with a typical 400 kHz. bandwidth, representative of the messages to be communicated and are designed to shut down upon completion of the individual message recordations.

Also included in the central post office are means responsive to the image signals representative of the preassigned destination for providing code signals uniquely identifying the destination as to location. Indicated by the data processing code file unit 200*b*, such means responds to the image-representative destination signals to select from its memory that one code signal which identifies the particular addressee for whom the message is intended. The code signal, for example, may be in the form of a digital code gleaned from a predetermined characteristic in the message-heading address, such as a telephone subscriber code or social security number. The code signals provided by the unit 200*b* are supplied when playback of the stored image signals is directed, to a plurality of adder units 200*e*$_1$, 200*e*$_2$, 200*e*$_3$, 200*e*$_4$, etc., which multiplexes the code signals with the image signals in an appropriate manner to form composite radio facsimile messages for transmission.

The central post office 200 further includes a plurality of concentrator units 200*c*$_1$, 200*c*$_2$, 200*c*$_3$, which units route the radio facsimile messages in numerical sequence to one of a like number of transmitters to complete the transmission. That is, the concentrator unit 200*c*$_1$ scans the code signal outputs of the multiplexer adders 200*e*$_1$, 200*e*$_2$, 200*e*$_3$, 200*e*$_4$, etc., in turn, and sequentially couples, for example: (a) all image and code signals directed for transoceanic communication to a transmitter 200*d*$_1$ serving the prescribed area by means of a first satellite in synchronous equatorial orbit; (b) all image and code signals directed for cross-country communication to a transmitter 200*d*$_2$ serving the intended area by means of a second such satellite; and (c) all such signals directed for local communication to the input of a CATV network operating within that region. Each concentrator typically may include its own magnetic tape recorder in which the message information to be routed to its respective transmitter is stored prior to the actual transmissions. In a typical arrangement, the video bandwidth capability of the concentrators 200*c*$_1$, etc., may each be of the order of 4 MHz.

Transmission from each of the units 200*d*$_1$ and 200*d*$_2$ in FIG. 2 may be at a single frequency or at different frequencies, depending upon the design of the satellite station employed. Where the satellite design is such that reradiated message signals can be assigned different identifying frequencies in response to transmitted code signals signifying different geographical locations, the message transmissions can be at a single frequency. Where the design is such that different identifying frequencies can not be determined in response to differing code signals, then the message transmissions will be at differing frequencies. In this way, a satellite serving the west coast of the United Stages, for example, can reradiate message signals destined for California at a frequency $f_1$, those destined for Oregon at a frequency $f_2$, those for Washington at a frequency $f_3$, etc. Several antennas or a single phased array capable of forming a number of independent beams may thus be used.

Figure 3:
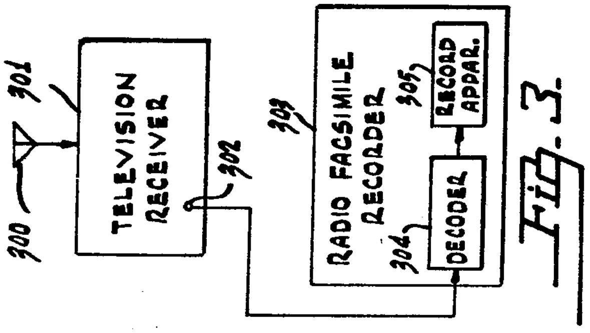
FIG. 3 is a block diagram showing one arrangement for the receiving portion of that postal system.

The block diagram of a receiving unit for the electronic postal system shown in FIG. 3 includes means conditioned to receive and reproduce the radiated message signals only at the location of the addressee of the written communication. As shown, this means may comprise a directive antenna 300 coupled to a television-type receiver 301 which is modified somewhat to make the received video signal available at an output terminal 302. The video signal is coupled from the terminal 302 to a radio facsimile recorder 303, which though shown as a separate unit, may be an integral part of a console including the television receiver 301. The recorder 303 is preset by an included decoder 304 to respond only to the presence of a unique code signal in the applied video signal, and all such decoder units are assigned different code signals with which to operate. Moreover, the code signal to which each decoder 304 is preset to operate with is set to exactly correspond with the code signal added to the message representative image signals by direction of the data processing unit 200*b* at the central post office (FIG. 2), in identifying the recipient of the desired communication. When a code signal is received which matches that preset into the decoder 304, the entire message-representative video signal is coupled from the output terminal 302 to the recording apparatus 305 of the unit 303, which then operates to reproduce the message information in an appropriate manner. Since the only recording apparatus which will respond to the received message signal is that located at the addressee's location, complete privacy will be assured because the reproduced hard copy will be generated only in the addressee's home or office.

I claim:

1. A radio facsimile postal system providing privacy in the transmission of a written message from the sender of the message to its intended recipient, comprising:

first means providing said message for transmission to said intended recipient;

second means cooperating with said first means for generating image signals representative of said message including the name and address of said recipient;

third means responsive to the image signals representative of the name and address of said recipient for providing category code signals uniquely identifying said recipient and for multiplexing said code signals with the image signals representative of said message to form a composite radio facsimile signal for direct transmission to said recipient and in which the code signals precede the message image signals;

fourth means for transmitting said composite radio facsimile signal including the assigned code signal uniquely identifying the intended recipient and the image message signal intended for his receipt into a geographical area in which said recipient is located are in which are located great numbers of other possible recipients of the intended message but each identified by differing category codes; and fifth means located at the address of the intended recipient for receiving said composite signals and conditioned to reproduce only those messages at his address location which are accompanied by said unique code signal assigned to him;

whereby privacy of transmission is fostered since said image message signal will only be reproduced at the address of the intended recipient to the exclusion of said other possible recipients in the same geographical area into which said composite signal is transmitted and since no intervening human factor forms part of the transmission system.

2. The system of claim 1 wherein said fourth means includes a microwave transmitter beamed at a relay satellite in synchronous equatorial orbit serving the geographical area in which said intended recipient and said other possible recipients are located.

3. The system of claim 1 wherein said fourth means includes a community antenna television network serving the geographical area in which said intended recipient and said other possible recipients are located.

4. The system of claim 1 wherein there is also included sixth means for returning said written message to the sender thereof after the generation of image signals representative of the message to further enhance privacy in the message transmission as no human factor need intervene in order to destroy the message after the transmission thereof.